United States Patent
Steiner et al.

(10) Patent No.: US 9,248,560 B2
(45) Date of Patent: Feb. 2, 2016

(54) CRIMPING TOOL

(71) Applicant: Rostra Tool Company, Branford, CT (US)

(72) Inventors: Richard A. Steiner, East Haddam, CT (US); Joseph Krzyzanski, New Haven, CT (US)

(73) Assignee: OETIKER TOOL CORPORATION, Branford, CT (US)

( * ) Notice: Subject to any disclaimer, the term of this patent is extended or adjusted under 35 U.S.C. 154(b) by 82 days.

(21) Appl. No.: 14/183,932

(22) Filed: Feb. 19, 2014

(65) Prior Publication Data
US 2014/0165353 A1 Jun. 19, 2014

Related U.S. Application Data

(63) Continuation-in-part of application No. 13/363,520, filed on Feb. 1, 2012.

(51) Int. Cl.
*B25B 27/10* (2006.01)
*B25B 7/02* (2006.01)
*B23P 11/00* (2006.01)

(52) U.S. Cl.
CPC ............... *B25B 27/10* (2013.01); *B23P 11/00* (2013.01); *B25B 7/02* (2013.01); *Y10T 29/53709* (2015.01)

(58) Field of Classification Search
CPC .................................... B25B 7/02; B23P 11/00
USPC ......... 29/243.5, 237, 268; 72/409.19, 453.16, 72/409.12
See application file for complete search history.

(56) References Cited

U.S. PATENT DOCUMENTS

| | | | |
|---|---|---|---|
| 1,107,684 A * | 8/1914 | Malllory | B21F 15/04 140/121 |
| 1,724,697 A | 8/1929 | Dobrick | |
| 2,089,133 A | 8/1937 | Parker | |
| 2,180,033 A * | 11/1939 | Cattoi | B21D 41/021 72/116 |
| 2,221,228 A * | 11/1940 | Maupin | B21D 41/021 72/116 |
| 2,350,054 A | 5/1944 | McIntosh | |
| 2,459,910 A | 1/1949 | Alvin | |
| 2,505,666 A | 4/1950 | Franck | |
| 2,774,269 A * | 12/1956 | Klingler | H01R 43/042 140/117 |
| 2,843,924 A | 7/1958 | Franck | |
| 2,892,480 A | 6/1959 | Franck | |
| 3,050,103 A | 8/1962 | Janik | |

(Continued)

OTHER PUBLICATIONS

Gear-Drive Space Saving Crimper Rostra Tool Company 30 East Industrial Road, Branford, CT 06405, USA. © 2012-2015 Rostra Tool Company.*

(Continued)

*Primary Examiner* — Monica Carter
*Assistant Examiner* — Mahdi H Nejad
(74) *Attorney, Agent, or Firm* — Cantor Colburn LLP

(57) ABSTRACT

The tool is provided comprising a first and second arm. The first arm having a first and second die slot on a side and a third die slot on an opposing side. The first arm further having a first gage slot on the side adjacent the second die slot and a second gage slot on the opposing side. The second arm being operably coupled to rotate relative to the first arm. The second arm having a fourth and a fifth die slot on a side arranged opposite the first die slot and the second die slot when the second arm is in a first position, the second arm also having a sixth die slot on an opposing side from the first die, the second arm further having a third gage slot on the side adjacent the fifth die slot and a fourth gage slot on the opposing side.

18 Claims, 9 Drawing Sheets

(56) References Cited

U.S. PATENT DOCUMENTS

| | | | |
|---|---|---|---|
| 3,117,617 A | 1/1964 | Meese | |
| 3,172,454 A * | 3/1965 | Wilson | B21D 41/00 72/416 |
| 3,525,107 A * | 8/1970 | Hays | H01R 43/042 7/107 |
| 3,935,757 A * | 2/1976 | Granberg | B23D 63/162 33/202 |
| 4,043,174 A * | 8/1977 | Paolino | H01R 43/042 140/106 |
| 4,108,589 A | 8/1978 | Bunch | |
| 4,225,990 A * | 10/1980 | Theiler, Sr. | H01R 43/0421 140/106 |
| 4,337,542 A * | 7/1982 | Theiler, Sr. | B25B 7/22 140/106 |
| 4,385,515 A * | 5/1983 | Link et al. | 72/416 |
| 4,526,023 A * | 7/1985 | Babb | B21D 41/021 72/116 |
| 4,538,443 A | 9/1985 | Gooding | |
| D289,005 S | 3/1987 | Babb | |
| 4,736,616 A | 4/1988 | Scotti | |
| 4,825,682 A | 5/1989 | Orav et al. | |
| 4,848,121 A * | 7/1989 | Rottinghaus | B25B 27/10 72/121 |
| 4,852,866 A * | 8/1989 | Kristoff | 269/87.2 |
| 5,685,085 A * | 11/1997 | Bond | G01B 3/42 33/520 |
| D400,893 S | 11/1998 | Peterson | |
| 5,966,777 A * | 10/1999 | Jantschek | E04B 2/7431 16/354 |
| 6,552,522 B1 * | 4/2003 | Zook | B25B 7/02 324/522 |
| 6,574,837 B2 * | 6/2003 | Jantschek | 16/371 |
| 6,684,439 B2 * | 2/2004 | Jeske | H02G 1/1214 7/107 |
| 6,971,179 B2 | 12/2005 | Erbrick | |
| 7,490,504 B1 | 2/2009 | Hirsch et al. | |
| 7,628,052 B2 | 12/2009 | Zhang | |
| 7,644,721 B2 * | 1/2010 | Hoberman | E04H 15/48 135/123 |
| D628,036 S | 11/2010 | Steiner | |
| 7,878,790 B2 | 2/2011 | Kidd | |
| 8,001,872 B2 * | 8/2011 | Gorrie | B67B 7/18 269/3 |
| 8,015,853 B2 | 9/2011 | Steiner et al. | |
| D685,239 S * | 7/2013 | Steiner et al. | D8/56 |
| 8,590,352 B2 * | 11/2013 | Bowles et al. | 72/31.01 |
| 2002/0170336 A1 * | 11/2002 | Carter | B21D 41/021 72/430 |
| 2004/0034968 A1 * | 2/2004 | Williams | E05D 3/122 16/122 |
| 2004/0118251 A1 * | 6/2004 | Wilson et al. | B25B 7/00 81/9.44 |
| 2004/0144154 A1 * | 7/2004 | Steiner | B21D 39/04 72/409.19 |
| 2008/0047319 A1 * | 2/2008 | Thibault | B25B 27/10 72/416 |
| 2009/0031778 A1 * | 2/2009 | Hamm | B25B 7/02 72/407 |
| 2009/0277310 A1 * | 11/2009 | Bell | B25B 7/02 81/309 |
| 2010/0024169 A1 * | 2/2010 | Self | A47K 3/36 16/354 |
| 2011/0000136 A1 * | 1/2011 | Brun | E05D 3/06 49/358 |
| 2011/0097138 A1 * | 4/2011 | Eikelenboom | B64G 1/222 403/81 |
| 2011/0271486 A1 * | 11/2011 | Wang | G06F 1/1681 16/319 |
| 2013/0125610 A1 * | 5/2013 | Bowles | B25B 27/10 72/409.01 |

OTHER PUBLICATIONS

SharkBite 3/8 in., 1/2 in. and 3/4 in. PEX Copper Crimp Tool with Integrated Go/No-Go Guage-23383—The Home Depot Website.*
Non Final Office Action, Issued Jan. 12, 2015.
Final Office Action for U.S. Appl. No. 13/363,520 dated May 5, 2015; 20 pages.

* cited by examiner

CRIMPING TOOL

CROSS REFERENCE TO RELATED APPLICATIONS (IF APPLICABLE)

The present invention is a Continuation-In-Part application of U.S. patent application Ser. No. 13/363,520 filed on Feb. 1, 2012 entitled Crimping Tool, the contents of which is incorporated by reference herein in its entirety.

BACKGROUND OF THE INVENTION

The subject matter disclosed herein relates to a crimping tool for nonmetallic tubing, and in particular to a crimping tool capable of crimping a plurality of different size rings.

Crimping tools are provided in a wide variety of configurations to accommodate various components, such as ring members to be clamped about plastic pipes or other fittings for sealing components together. Although substantial forces are required to crimp a ring member in the desired position, most crimping tools are constructed in a manner which provides adequate mechanical advantage to enable the tool jaws to impart the desired amount of force to the ring members.

Crimping tools may be used with a wide variety of pipes and fittings. In a typical application, such in a residential plumbing system for example, these pipes and fittings may come in two or three different sizes, such as ⅜", ½", or ¾" for example. These types of applications resulted in the user needing to carry multiple tools to the job site to accommodate each of the different size ring members. Alternatively, some crimping tools include interchangeable dies that allow a single tool to crimp multiple size rings.

It should be appreciated that the crimped connection is typically checked by the user to ensure it has been properly formed. To do this, the user may carry a gage, such as go/no-go type gage for example, that allows the user to measure the crimped connection. Thus the user needs to carry additional tools and a gage to the job site.

Accordingly, while existing crimping tools are suitable for their intended purposes the need for improvement remains, particularly in providing a compact tool capable of crimping a variety of sizes of ring members and determining whether a proper crimp has been formed.

BRIEF DESCRIPTION OF THE INVENTION

According to one aspect of the invention, a tool for crimping a ring member on a pipe is provided. The tool includes a first arm and a second arm. The first arm has a first die slot and a second die slot on a side and a third die slot on an opposing side, the first die slot being larger than the second die slot, the third die slot being larger than the first die slot, the first arm further having a first gage slot on the side adjacent the second die slot and a second gage slot on the opposing side. A second arm is operably coupled to rotate relative to the first arm, the second arm having a fourth die slot and a fifth die slot on a side arranged opposite the first die slot and the second die slot when in a first position, the second arm also having a sixth die slot on an opposing side from the fourth die slot, the second arm further having a third gage slot on the side adjacent the fifth die slot and a fourth gage slot on the opposing side.

According to another aspect of the invention, another tool for crimping a ring member on a pipe is provided. The tool including a first arm rotatable between a first position and a second position about a first pivot. The first arm including a first side and a second side. The first side having a semi-circular first die slot, an adjacent semi-circular second die slot, the first side further having a first gage slot, the first gage slot defining an upper tolerance limit for a first ring crimped in the first semi-circular slot. The second side having a semi-circular third die slot, the distance from the first pivot to the third die slot being larger than the distance from the first pivot to the first die slot, the second side further having a second gage slot, the second gage slot defining an upper tolerance limit for a second ring crimped in the third semi-circular slot. The first arm further includes a third gage slot being arranged on a first end opposite the first pivot, the third gage slot defining an upper tolerance limit for a third ring crimped in the second semi-circular slot. The tool includes a second arm operably coupled to the first arm and rotatable about a second pivot. The second arm including a third side and an opposing fourth side. The third side having a semi-circular fourth die slot, the first die slot and fourth die slot configured to crimp the first ring in the first position. The third side having semi-circular fifth die slot, the second die slot and the fifth die slot configured to crimp the second ring in the first position, the second ring having a smaller diameter than the first ring, the third side further having a fourth gage slot configured to define a lower tolerance limit for the first ring. The fourth side having a semi-circular sixth die slot, the third die slot and the sixth die slot configured to crimp the third ring in the second position, the fourth side further having a fifth gage slot configured to define a lower tolerance limit for the second ring. A six gage slot is arranged on a second end opposite the second pivot, the six gage slot being configured to define a lower tolerance limit for the second ring.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 9:
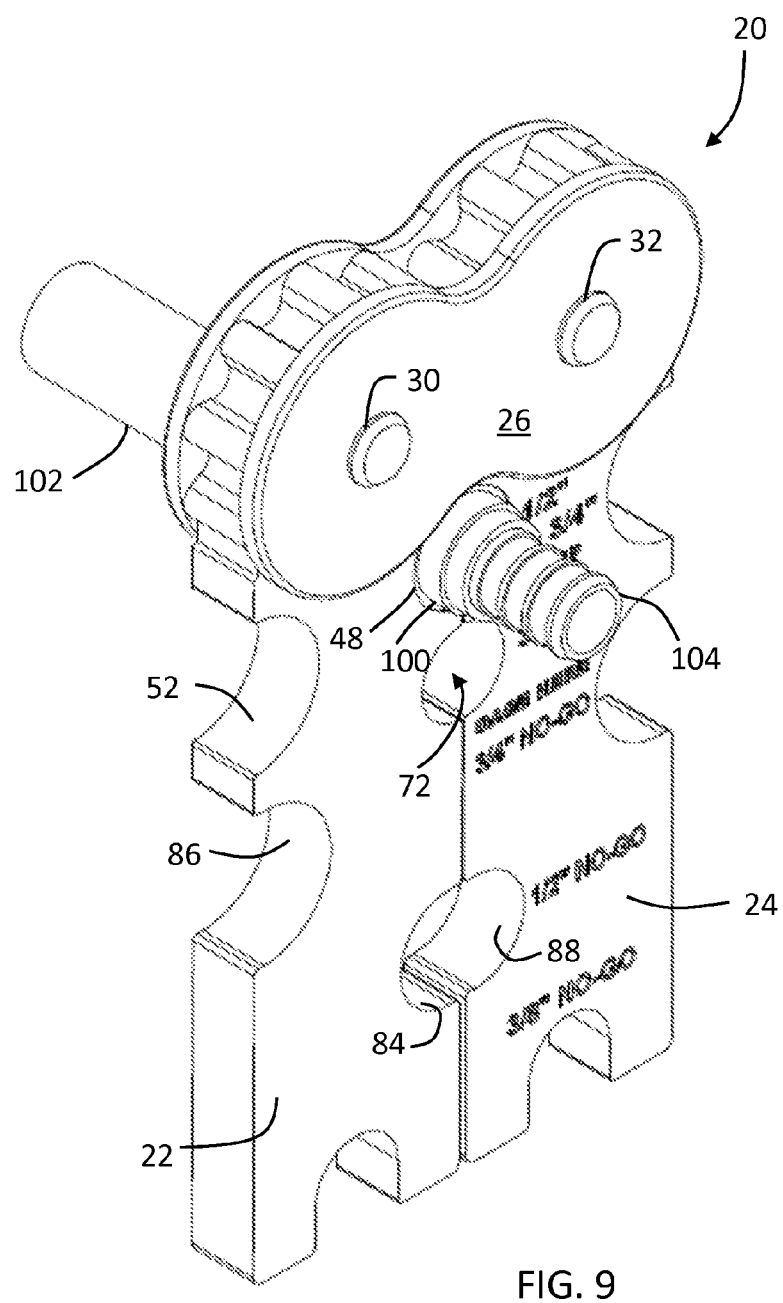
FIG. 9 is a perspective view of the tool crimping a tube onto a fitting with a ring member in accordance with an embodiment of the invention in the first position.

Referring now to FIGS. 1-7, an embodiment of a crimping tool 20 is shown. The crimping tool 20 includes a first arm 22 and a second arm 24 pivotally coupled to a linkage 26 on a first end 28. In one embodiment, the crimping tool 20 includes a pair of linkages 26 disposed on opposing sides of the arms 22, 24. The arms 22, 24 are made from a suitable material capable of transferring the crimping forces that are applied to a ring member 100 when coupling a polymer pipe 102 to a fitting 104 (FIG. 9). In the exemplary embodiment, the arms are made from steel.

The arms 22, 24 are coupled to the linkage 26 by a pivot 30, 32 respectively. In the exemplary embodiment, the pivots 30, 32 are rivets that couple the arms 22, 24 to the linkage 26 and prevent the arms 22, 24 from being separated from the linkage 26 or each other. Each arm may further include a gear 34, 36 disposed about the pivots 30, 32. In the exemplary embodiment, the gears 34, 36 are integrally formed on the end 28 of the arms 22, 24. In another embodiment, the gears 34, 36 are a separate component that is rigidly coupled to the arms 22, 24. Each of the gears 34, 36 has a plurality of teeth 38, 40 respectively. The gears 34, 36 are arranged such that the teeth 38 of gear 34 are in a meshed engagement with the teeth 40 of gear 36. As a result, the movement of an arm (e.g. arm 22) causes the other arm (e.g. arm 24) to rotate in a synchronized manner relative to the other arm. It has been found that the synchronization of the arm 22, 24 movements provides advantages in reducing the tolerance that may be achieved on the resulting crimp of the ring member to be in compliance with American Society of Testing and Materials (ASTM) standard F1807. In another embodiment, the gears 34, 36 are omitted and the arms 22, 24 are allowed to freely rotate relative to each other.

In the exemplary embodiment, the first arm 22 includes a generally planar face 42 with a pair of surfaces 44, 46 that extend perpendicular to the face 42 on opposite sides of the first arm 22. Adjacent the first surface 44 a plurality of crimping die slots 48, 50 are formed that extend perpendicular to the face 42. In the exemplary embodiment, the die slot 50 is formed between the surfaces 44, 45. As will be discussed in more detail below, the surfaces 44, 45 are configured to be co-planar, while the surfaces 46, 47 are parallel, but offset from each other. The die slots 48, 50 have a semi-circular shape and are sized to receive a ring member 100 (FIG. 9) during use. The die slots 48, 50 each have a different size diameter allowing the die slots 48, 50 to receive a different size ring member during use. Similarly, adjacent the second surface 46 at least one semi-circular die slot 52 is arranged substantially perpendicular to the face 42. In one embodiment, a plurality of die slots (not shown) may be formed on either side of second surface 46.

Figure 1:
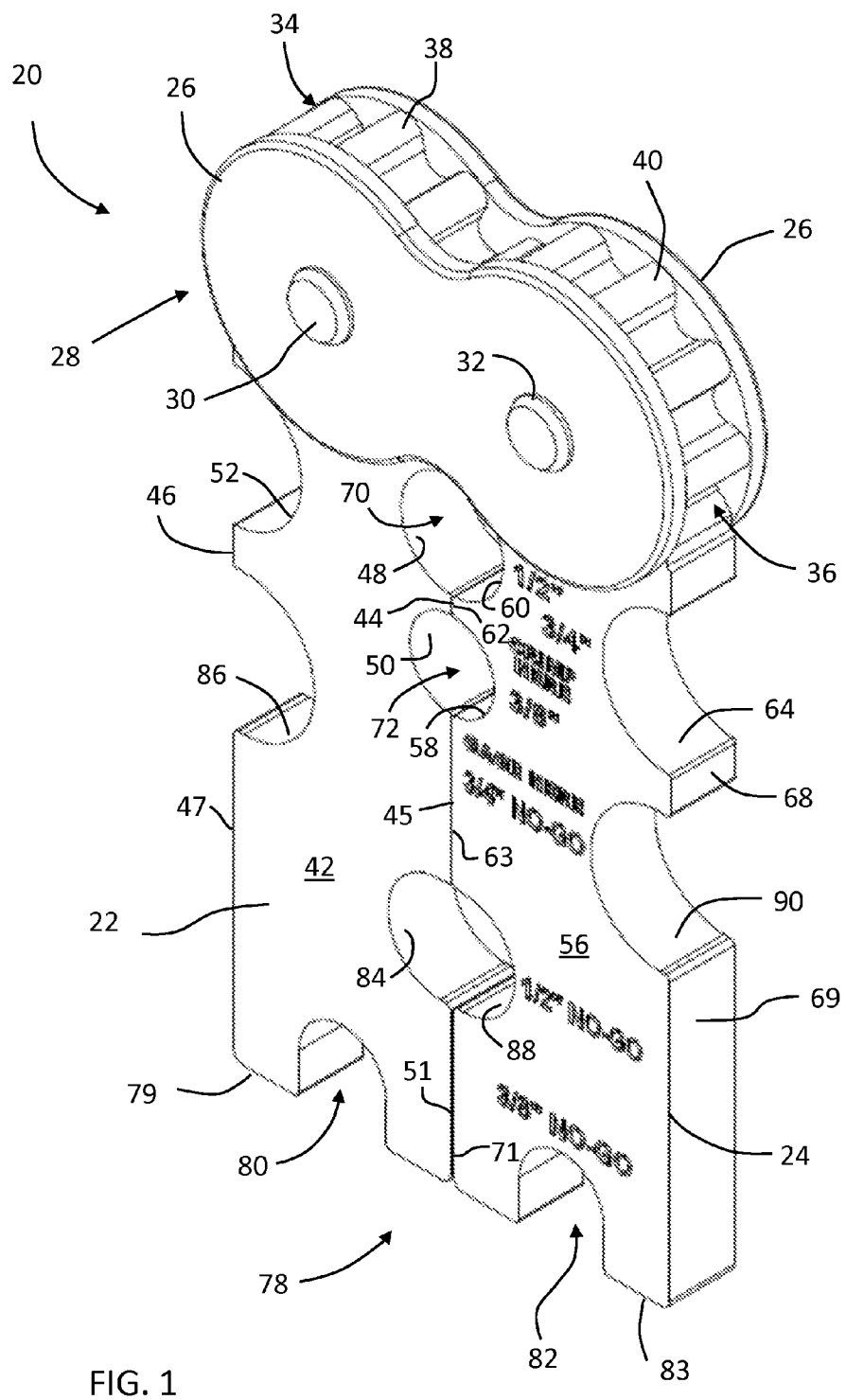
FIG. 1 is a perspective view of a tool in a first position in accordance with an embodiment of the invention.
Figure 2:
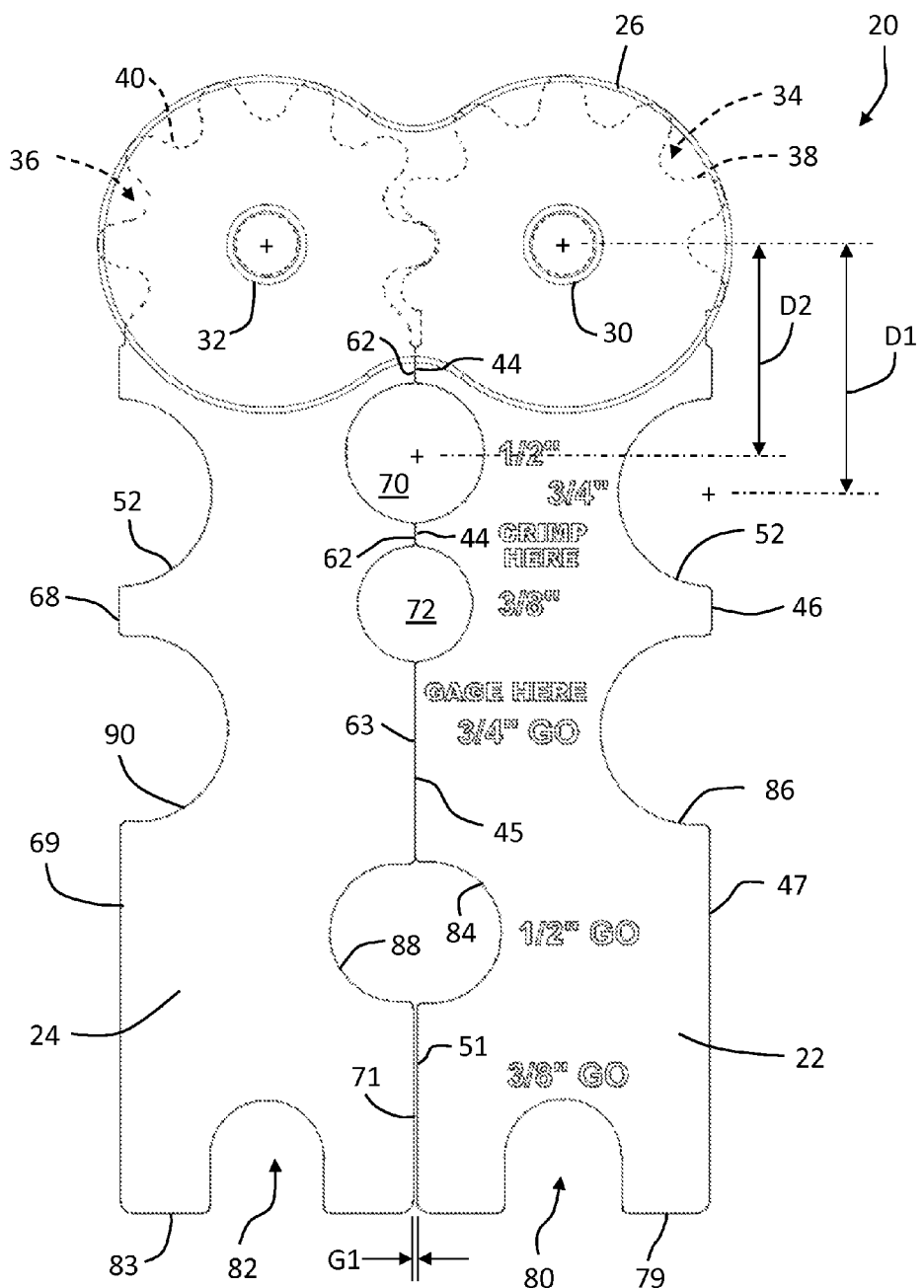
FIG. 2 is a front view of the embodiment of FIG. 1.
Figure 3:
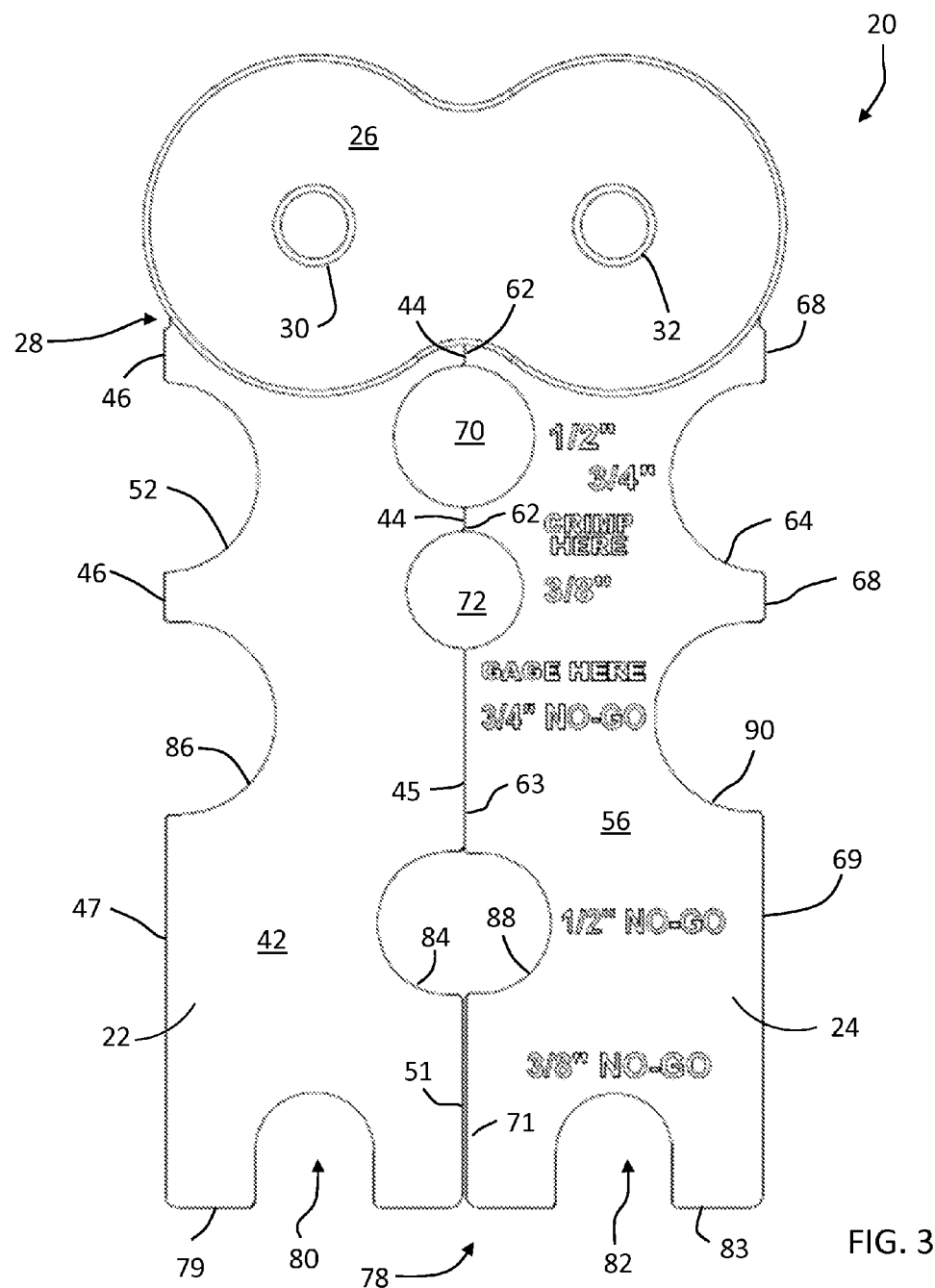
FIG. 3 is rear view of the embodiment of FIG. 1.
Figure 4:
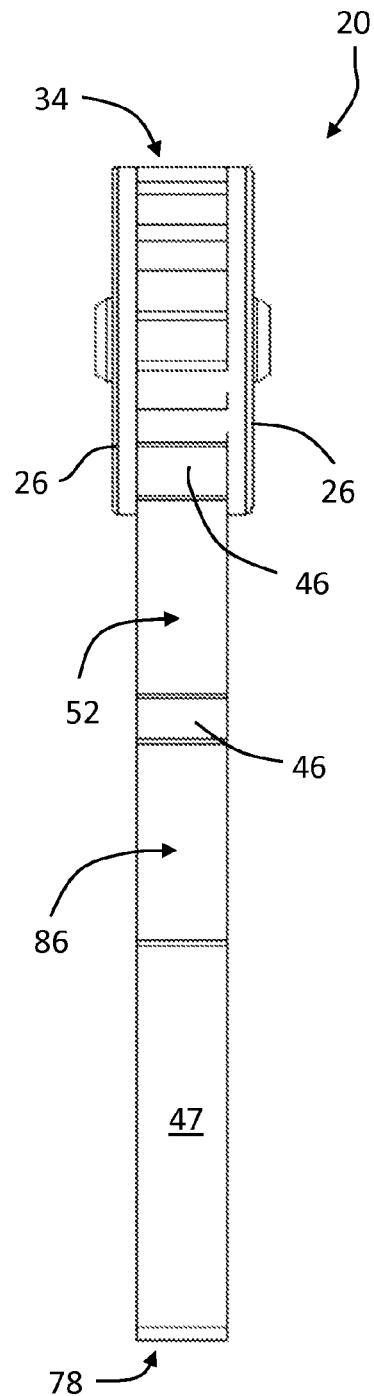
FIG. 4 is a side view of the embodiment of FIG. 1.
Figure 5:
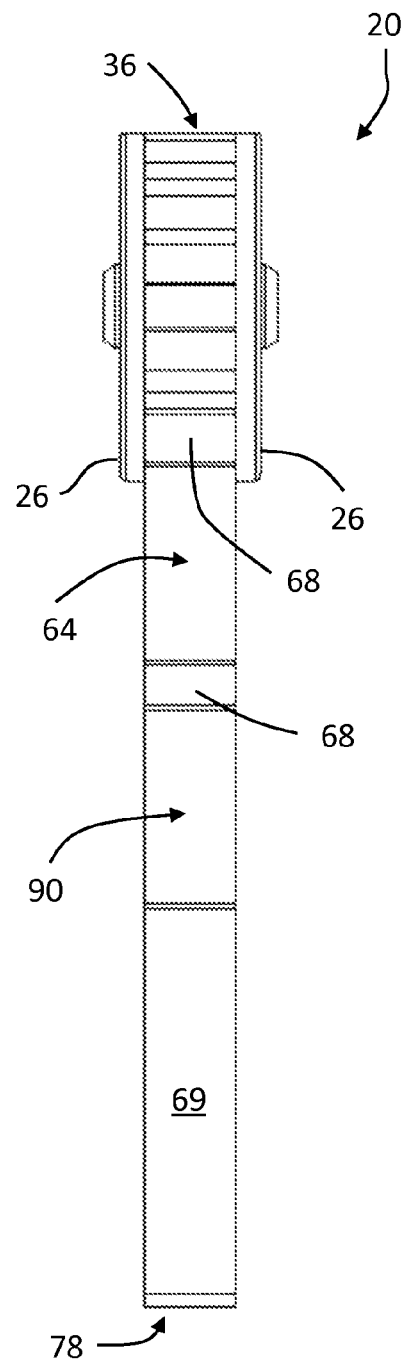
FIG. 5 is another side view of the embodiment of FIG. 1.
Figure 6:
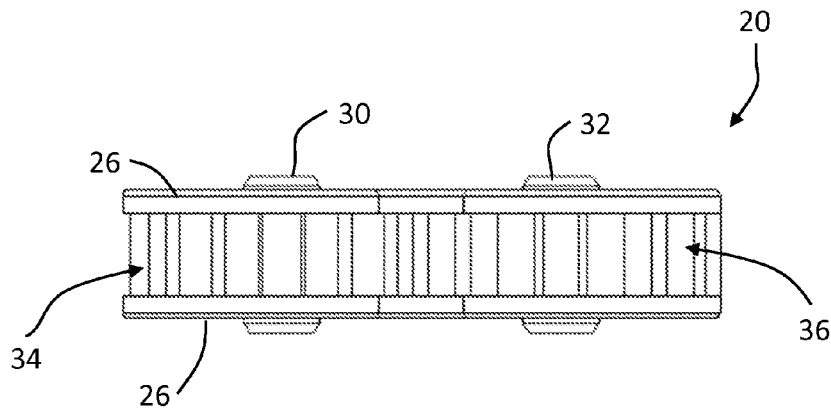
FIG. 6 is a first end view of the embodiment of FIG. 1.
Figure 7:
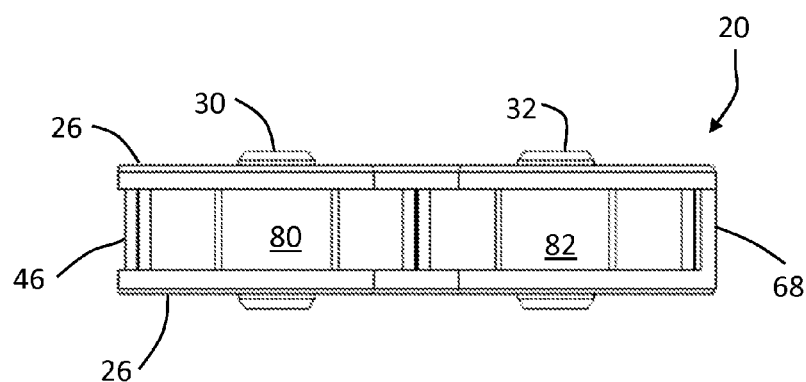
FIG. 7 is a second end view of the embodiment of FIG. 1.
Figure 8:
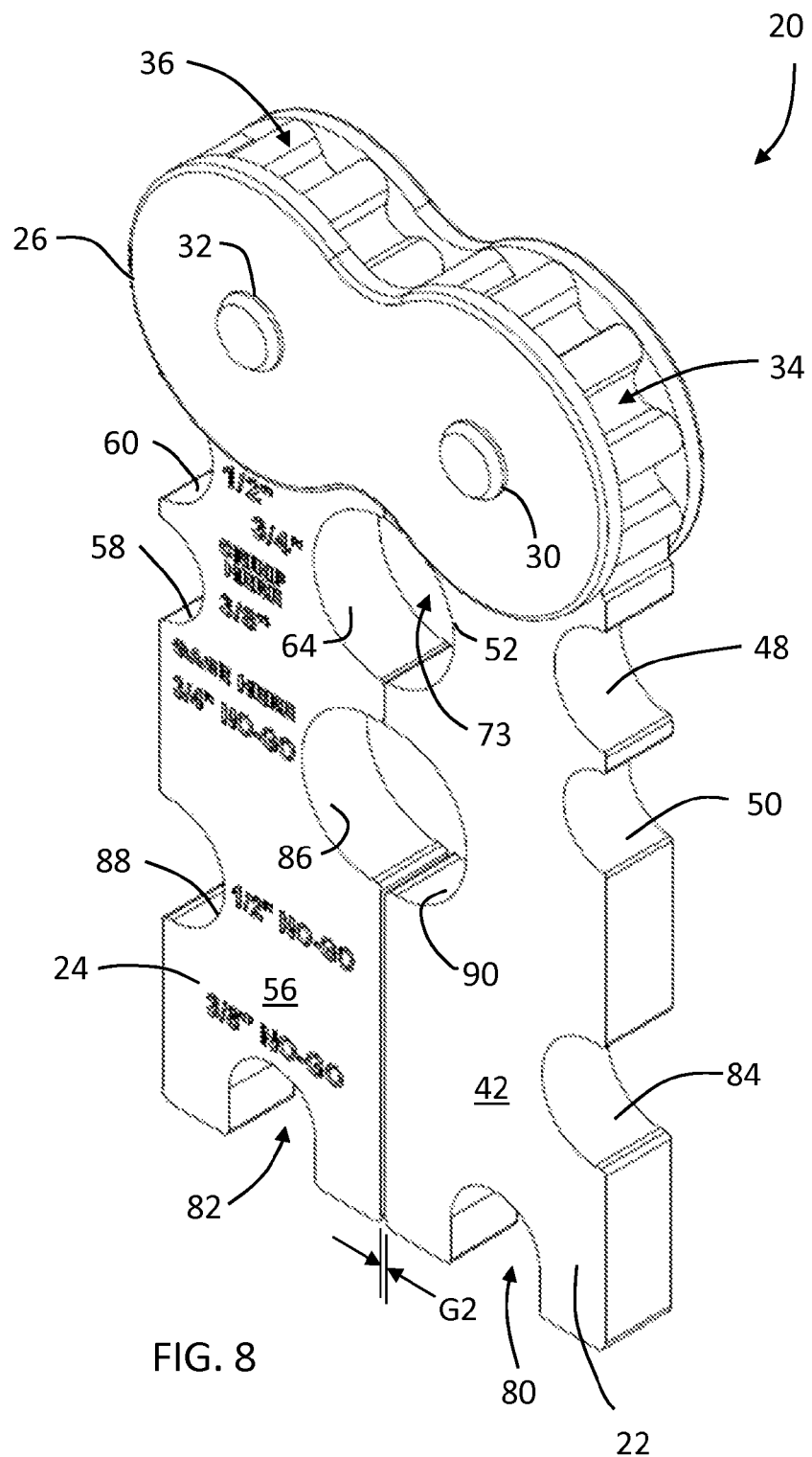
FIG. 8 is a perspective view of the embodiment of FIG. 1 in a second position.

It should be appreciated that in the exemplary embodiment the second arm 24 is configured as a mirror image of the first arm 22 and includes a planar face 56, first plurality of die slots 58, 60 arranged on adjacent surfaces 62, 63 and at least one die slot 64 is adjacent opposing surfaces 68, 69. The surfaces 62, 63 are configured to be co-planar, while the surfaces 68, 69 are generally parallel but offset. The die slots 48, 50 and die slots 58, 60 are arranged to cooperate to form a pair of circular openings 70, 72 when the crimping tool 20 is in the first position such that the surfaces 44, 45 are rotated adjacent to or in contact with the surfaces 62, 63 (FIG. 1). Similarly, when in the second position such that the surface 46 is rotated adjacent to or in contact with the surface 68, the die slot 52 cooperates with the crimping slot 64 to form another circular opening 73 (FIG. 8). In one embodiment, the openings 70, 72, 73 are each sized to receive a different size ring member.

It has been found that improvements in the reliability of ring crimping and in manufacturability of the tool 20 by providing a gap between the opposing surfaces of the arms 22, 24 at the second end 78. In the exemplary embodiment, the first arm includes a surface 51 adjacent the second end 78 that is generally parallel to but offset from the surface 63. Similarly, the second arm 24 includes a surface 71 adjacent the second end that is generally parallel to but offset from the surface 63. When the tool 20 is in the first position, the offset of the surfaces 51, 71 define a gap G1. The gap G1 allows the surfaces 44, 62 and surface 45, 63 to contact during the crimping operation. Similarly, a gap G2 (FIG. 8) is defined between the surfaces 47, 69 when the tool 20 is in the second position so that the surfaces 46, 68 contact during operation. The gaps G1, G2 provide advantages by allow the surfaces adjacent the openings 70, 72, 73 to contact while accommodating any dimensional changes or distortions caused by heat treating during manufacturing.

In one embodiment, the larger diameter openings 70, 73 are positioned closer to the pivots 30, 32 than the opening 72 to provide an increased mechanical advantage on the more frequently used sizes. The distance D1 from the pivots 30, 32 to the larger opening 73 may be greater than the distance D2 from the pivots 30, 32 to the opening 70 in a direction away from the pivots 30, 32. In other words, the larger opening 73 is offset from the opening 70. In the exemplary embodiment, the opening 70 is sized to receive a 0.5 inch ring member 100 and the opening 73 is sized to receive a 0.75 inch ring member.

It should also be appreciated that by having die slots sized to receive the ring members on opposing sides, the configuration of the crimping tool 20 may be reversed to allow a single crimping tool 20 to be used with multiple sizes of ring members. This provides advantages in reducing the number of tools a user has to carry to a job site, reducing time in finding the right tool and reducing the weight of the user's tool box.

The arms 22, 24 each further include a plurality of gage slots that are sized to allow the user to determine if the rings have been sufficiently crimped. In the exemplary embodiment, the gage slots 80, 84, 86 in the first arm 22 are configured to be what is typically known as a "Go" type gage, while the gage slots 82, 88, 90 are configured to be a "No-Go" type of gage. A Go/No-Go type gage is a device used to check an object being inspected, such as the crimped ring for example, against allowed or desired tolerances. A Go/No-Go gage is a measuring tool that does not return a specific size, but instead allows the user to determine if the object is within a range. The state of the object is either acceptable (the part is within tolerance and may be used) or it is unacceptable (and must be rejected). In the application of a tool for crimping a ring on PEX tubing, the Go gage is used to determine that the connection has sufficient crimp and the No-Go gage is used to determine that the connection is not over-crimped. In other words, the Go gage defines the upper tolerance limit while the No-go gage defines the lower tolerance limit.

In the exemplary embodiment, the Go gage slots are all arranged on the first arm 22 and the No-go gage slots are arrange on the second arm 24. It should be appreciated that this is for exemplary purposes and the claimed invention should not be so limited.

The Go gage slot 84 is formed between the surfaces 45, 51. The gage slot 84 is generally perpendicular to the face 42 with an open side that faces the second arm 24 when in the first position. A second Go gage slot 86 is formed between the surfaces 46, 47. The second gage slot 84 is generally perpendicular to the face 42 with an open side that faces the second arm 24 when in the second position. A third Go gage slot 80 is formed in an end surface 79. In the exemplary embodiment, the first Go gage slot 84 corresponds to a ring size associated with opening 70, the second Go gage slot 86 corresponds to a ring size associated with opening 73, while the third Go gage slot 80 corresponds to a ring size associated with opening 72.

In the exemplary embodiment, the No-go gage slots are formed in the second arm 24 in a mirror arrangement to the first arm 22. The second arm 24 includes a first No-go slot 88 formed between the surfaces 63, 71. The first No-go slot 88 is formed generally perpendicular to the face 56 with an open side that faces the slot 84 when in the first position. A second No-go slot 90 is formed between the surfaces 68, 69. The second No-go slot 90 is formed generally perpendicular to the surface 56 and has an open side that faces the slot 86 when in the second position. Finally, a third No-go gage slot 82 is formed in an end surface 83. In the exemplary embodiment, the first No-go gage slot 88 corresponds to a ring size associated with opening 70, the second No-go gage slot 90 corresponds to a ring size associated with opening 73, while the third No-go gage slot 82 corresponds to a ring size associated with opening 72.

In operation, the ring member 100 is installed on to the desired tubing 102 (FIG. 9) or pipe, such as cross-linked polyethylene (PEX) tube for example, adjacent an end to allow the coupling of the tube 102 to a fitting 104. The end of the tubing 102 is slid onto the fitting 104 and the ring 100 is positioned over the tube 102 and fitting 104. The crimping tool 20 is opened by rotating the arms 22, 24 away from each other allowing the ring member to pass there between and into the appropriately sized die slots. When the ring member is positioned within the desired die slots, the user squeezes the end 79, 83 of the tool 20 until the surfaces adjacent the die slot being used to come into contact. In the embodiment of FIG. 9, a 0.5 inch ring member 100 is crimped onto the tube 102 and fitting 104. To perform the crimp, the operator positions the tube, fitting, ring assembly in the opening 70. The tool 20 is squeezed until the surfaces 44, 62 or surfaces 45, 63 contact each other. By squeezing the tool 20, the user obtains the desired amount of mechanical advantage to crimp the ring member 100 onto the tube/fitting assembly 102, 104 and form a seal. The crimping of the ring member 100 secures the tubing 102 onto the fitting 104.

Figure 10:
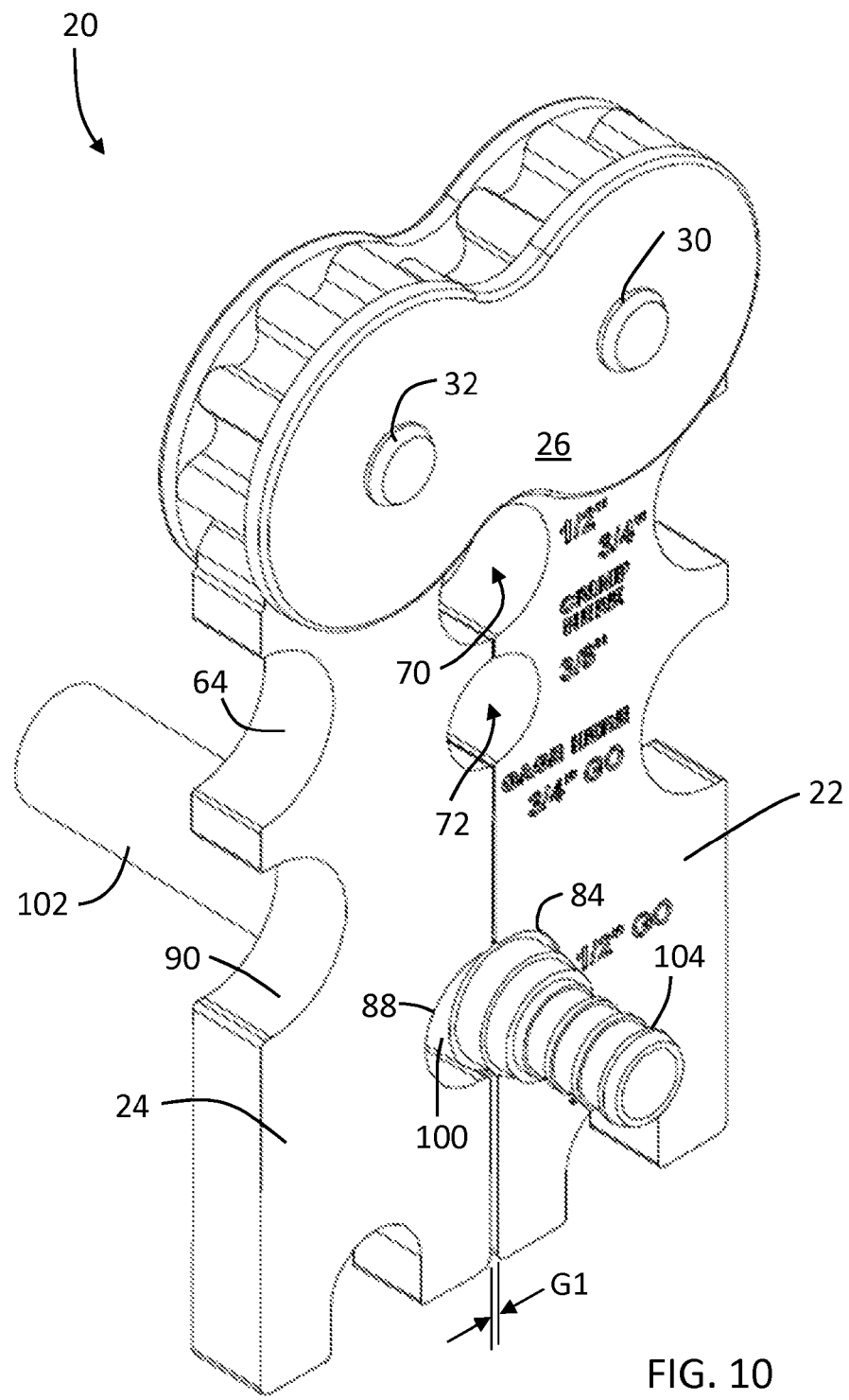
FIG. 10 is a perspective view of the tool being used to check the crimped ring of FIG. 9 in the first position.
Figure 11:
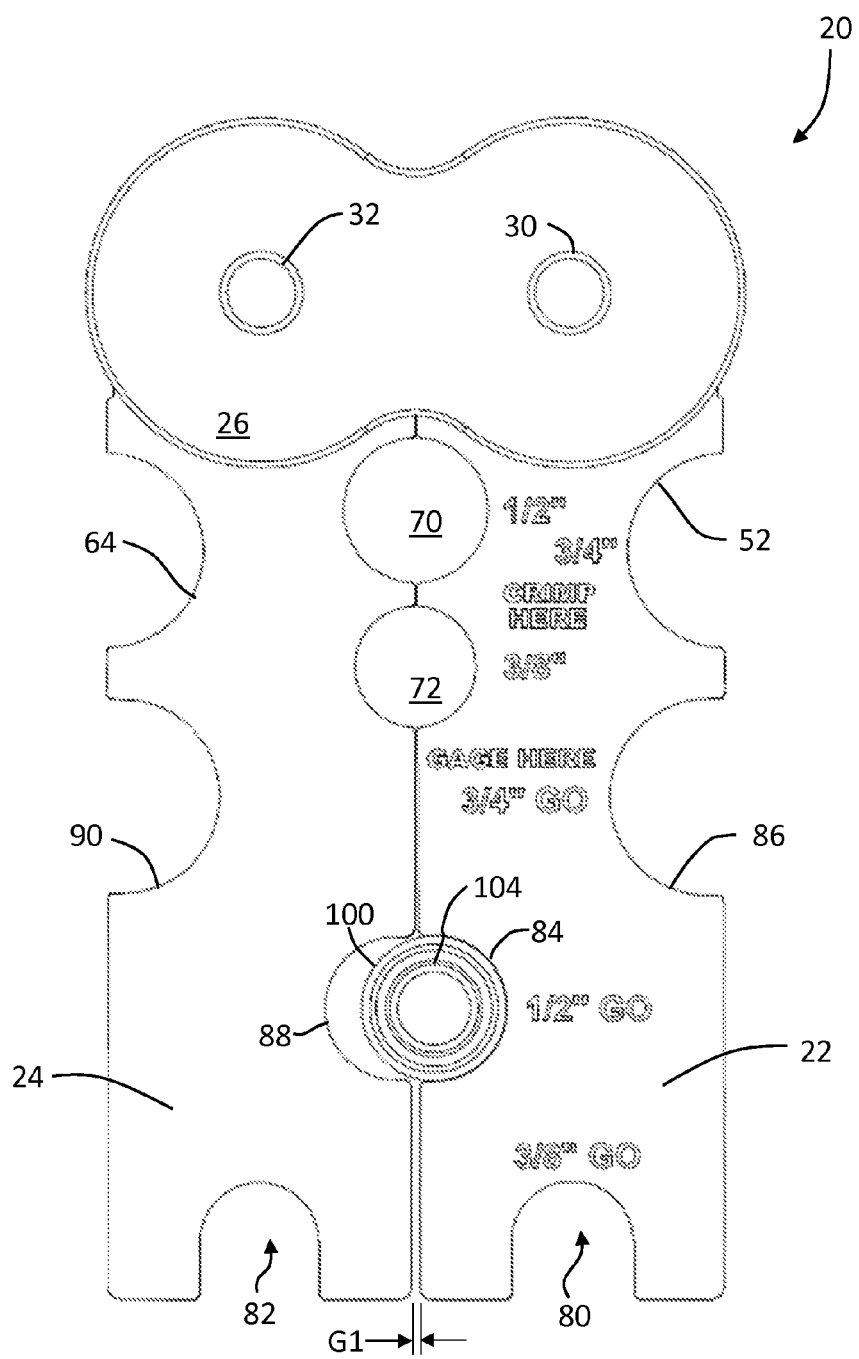
FIG. 11 is a front view of the crimping tool of FIG. 10.

The user then uses the corresponding Go gage slots 80, 84, 86 to determine if the crimping operation performed provided the desired level of crimp. Using the illustrated embodiment of FIG. 10, the user opens the tool 20 and moves the crimped assembly between the arms 22, 24 to the position of the gage slots 84, 88. The user may then close (e.g. rotate the arms 22, 24 towards each other) the tool. If the connection fits within the Go gage slot and does not fit within the No-go slot, then the user knows the crimped connection is within the desired tolerances. Turning to the illustrated embodiment of FIGS. 10-11, the crimped connection slides into the Go gage slot 84 and the user is unable to fully close the tool 20 resulting in a gap G1. Since the user is unable to fully close the arms 22, 24, the crimped connection is within the desired tolerances. It should be appreciated that if the user was able to fully close the tool 20, then the amount of crimp performed was too large and the connection would fall below the desired tolerance range.

It should be appreciated that embodiments of the claimed invention provide advantages in allowing a single integrated tool to replace both multiple crimping tools and a gage. This provides advantages in reducing the costs to a user and reducing the weight of the tools they must carry to and while on a job site. Embodiments of the present invention provide still further advantages in reducing the time is takes for a user to set up and perform crimping operations, particularly in environments with multiple size tubes being used.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A tool for crimping a ring member on a pipe, the tool comprising:
   a first arm having a first die slot and a second die slot on a side and a third die slot on an opposing side, the first die slot being larger than the second die slot, the third die slot being larger than the first die slot, the first arm further having a first gage slot on the side adjacent the second die slot and a second gage slot on the opposing side; and
   a second arm operably coupled to rotate relative to the first arm, the second arm having a fourth die slot and a fifth die slot on a side arranged opposite the first die slot and the second die slot when in a first position, the second arm also having a sixth die slot on an opposing side from the fourth die slot, the second arm further having a third gage slot on the side adjacent the fifth die slot and a fourth gage slot on the opposing side, wherein
   the first arm is arranged to rotate about a pivot between the first position and a second position, wherein the third die slot is adjacent the sixth die slot in the second position;
   the first die slot is arranged a first distance from the pivot when in the first position;
   the third die slot is arranged a second distance from the pivot when in the second position, the second distance being larger than the first distance;
   the first arm further includes a fifth gage slot on an end of the first arm opposite the pivot; and
   the second arm further includes a sixth gage slot on an end of the second arm opposite the pivot.

2. The tool of claim 1 wherein:
   the first arm further includes a first surface disposed between the first die slot and the second die slot;
   the second arm further includes a second surface disposed between the fourth die slot and the fifth die slot; and
   the first surface and the second surface are in contact in the first position.

3. The tool of claim 2 wherein:
   the first arm further includes a third surface between the third gage slot and an end of the first arm opposite the pivot;

the second arm further includes a fourth surface between the first gage slot and an end of the second arm opposite the pivot; and the third surface and the fourth surface define a first gap therebetween when the first surface contacts the second surface in the first position.

4. The tool of claim 3 wherein:

the first arm further includes a fifth surface between the third die slot and the second gage slot;

the second arm further includes a sixth surface between the sixth die slot and the fourth gage slot; and the fifth surface and the sixth surface contact when in the second position.

5. The tool of claim 4 wherein:

the first arm further includes a seventh surface between the second gage slot and the end of the first arm opposite the pivot;

the second arm further includes an eighth surface between the fourth gage slot and the end of the second arm opposite the pivot; and the seventh surface and the eighth surface define a second gap when the fifth surface contacts the sixth surface.

6. The tool of claim 1 wherein:

the first die slot and the fourth die slot are configured to crimp a first ring in the first position, the first gage slot configured to define an upper tolerance limit for a first crimped connection having the first ring;

the second die slot and the fifth die slot are configured to crimp a second ring in the first position, the second ring being smaller in diameter than the first ring, the fifth gage slot being configured to define an upper tolerance limit for a second crimped connection having the second ring; and the third die slot and the sixth die slot are configured to crimp a third ring in the second position, the third ring being larger in diameter than the first ring, the second gage slot being configured to define an upper tolerance limit for a third crimped connection having the third ring.

7. The tool of claim 6 wherein:

the third gage slot is configured to define a lower tolerance limit for the first crimped connection;

the sixth gage slot being configured to define a lower tolerance limit for the second crimped connection; and the fourth gage slot being configured to define a lower tolerance limit for the third crimped connection.

8. The tool of claim 6 wherein:

the first ring has a diameter sized to fit a 0.5 inch pipe;

the second ring has a diameter sized to fit 0.375 inch pipe; and the third ring has a diameter sized to fit a 0.75 inch pipe.

9. The tool of claim 1 wherein:

the first arm includes a first gear disposed adjacent the pivot, the first gear having a first plurality of teeth;

the second arm includes a second gear disposed adjacent the pivot, the second gear having a second plurality of teeth; and the first plurality of teeth and the second plurality of teeth are arranged in a meshed configuration to synchronize the movement of the first arm and second arm between the first position and second position.

10. A tool for crimping a ring member on a pipe, the tool comprising:

a first arm rotatable between a first position and a second position about a first pivot, the first arm including:

a first side and a second side;

the first side having a semi-circular first die slot, an adjacent semi-circular second die slot, the first side further having a first gage slot, the first gage slot defining an upper tolerance limit for a first ring crimped in the first semi-circular slot;

the second side having a semi-circular third die slot, the distance from the first pivot to the third die slot being larger than the distance from the first pivot to the first die slot, the second side further having a second gage slot, the second gage slot defining an upper tolerance limit for a second ring crimped in the third semi-circular slot; and a third gage slot being arranged on a first end opposite the first pivot, the third gage slot defining an upper tolerance limit for a third ring crimped in the second semi-circular slot;

a second arm operably coupled to the first arm and rotatable about a second pivot, the second arm including: a third side and an opposing fourth side;

the third side having a semi-circular fourth die slot, the first die slot and the fourth die slot configured to crimp the first ring in the first position;

the third side having a semi-circular fifth die slot, the second die slot and the fifth die slot configured to crimp the second ring in the first position, the second ring having a smaller diameter than the first ring, the third side further having the fourth gage slot configured to define a lower tolerance limit for the first ring;

the fourth side having a semi-circular sixth die slot, the third die slot and the sixth die slot configured to crimp the third ring in the second position, the fourth side further having a fifth gage slot configured to define a lower tolerance limit for the second ring; and a sixth gage slot being arranged on a second end opposite the second pivot, the sixth gage slot being configured to define a lower tolerance limit for the second ring.

11. The tool of claim 10 wherein:

the first arm includes a first surface disposed between the first die slot and the second die slot;

the second arm further includes a second surface disposed between the fourth die slot and the fifth die slot; and the first surface contacts the second surface in the first position.

12. The tool of claim 11 wherein:

the first arm includes a third surface between the first gage slot and the first end;

the second arm includes a fourth surface between the fourth gage slot and the second end; and the third surface and fourth surface define a first gap when the first surface contacts the second surface.

13. The tool of claim 12 wherein:

the first arm further includes a fifth surface between the third die slot and the second gage slot;

the second arm further includes a sixth surface between the sixth die slot and the fifth gage slot; and the fifth surface contacts the sixth surface in the second position.

14. The tool of claim 13 wherein:

the first arm further includes a seventh surface between the second gage slot and the first end;

the second arm further includes an eighth surface between the fifth gage slot and the second end; and the seventh surface and the eighth surface define a second gap when the fifth surface contacts the sixth surface.

15. The tool of claim 14 wherein:
the first ring has a diameter sized to fit a 0.5 inch pipe;
the second ring has a diameter sized to fit 0.375 inch pipe; and
the third ring has a diameter sized to fit a 0.75 inch pipe.

16. The tool of claim 14 wherein:
the first arm further includes a first gear disposed about the first pivot;
the second arm includes a second gear disposed about the second pivot, the second gear cooperating with the first gear to synchronize the rotation of the first arm and second arm between the first position and second position.

17. The tool of claim 14 wherein:
the first arm further includes a ninth surface between the second die slot and the first gage slot, the ninth surface being substantially co-planar with the first surface; and
the second arm further includes a tenth surface between the fifth die slot and the fourth gage slot, the tenth surface being substantially co-planar with the second surface.

18. The tool of claim 17 wherein the ninth surface and tenth surface contact in the first position.

\* \* \* \* \*